United States Patent [19]

Bagby

[11] Patent Number: 5,319,679
[45] Date of Patent: Jun. 7, 1994

[54] METHOD AND APPARATUS FOR RECOVERING DATA FROM A RADIO SIGNAL

[75] Inventor: David Bagby, Templeton, Calif.

[73] Assignee: Datum Systems, Santa Cruz, Calif.

[21] Appl. No.: 988,081

[22] Filed: Dec. 9, 1992

[51] Int. Cl.⁵ .............................................. H04L 7/00
[52] U.S. Cl. .................................... 375/106; 375/111; 307/231; 307/518
[58] Field of Search ...................... 375/106, 111, 113; 307/231, 510, 518, 351, 355, 62, 73

[56] References Cited

U.S. PATENT DOCUMENTS

| | | | |
|---|---|---|---|
| 4,620,300 | 10/1986 | Ogawa | 375/106 X |
| 4,716,578 | 12/1987 | Wight | 375/106 X |
| 4,817,111 | 3/1989 | Tasto et al. | 375/111 |
| 5,170,415 | 12/1992 | Yoshida et al. | 375/113 |
| 5,216,696 | 6/1993 | Poklemba | 375/106 X |

OTHER PUBLICATIONS

Sollenberger et al, "Low-Overhead Symbol Timing and Carrier Recovery for TDMA Portable Radio Systems", IEEE Transactions on Comm vol. 38, No. 10 Oct. 1990 pp. 1886-1892.

Primary Examiner—Stephen Chin
Assistant Examiner—Bryan Webster
Attorney, Agent, or Firm—Townsend & Townsend Khourie & Crew

[57] ABSTRACT

In a communications system using a synchronous digital data stream employing multiple-amplitude-level symbols, preamble acquisition and d.c. offset correction is achieved simultaneously by receiver averaging of sampled values in amplitude and in time to determine the average d.c. offset and the nominal transition boundaries between symbols. After symbol timing acquisition and d.c. offset acquisition, other circuitry is enabled for symbol tracking, and additional circuitry uses the acquired d.c. offset and symbol timing information to extract the data from the symbol stream. D.c. offset tracking involves subtracting the d.c. offset value from the output of an ADC representing the digitized baseband signal and then adjusting the d.c. offset value by a fraction of the error between the actual value and the expected value relative to the offset corrected signal. Symbol timing tracking is accomplished through examination of the d.c. offset-corrected digitized baseband signal during a symbol timing window centered on the symbol clock transition for signal amplitude near the nominal center of amplitude ranges expected for any one of the allowable symbols. Timing is corrected by adding or subtracting counts from a binary counter whose phase was previously preset during acquisition mode. The subtracting and adding may be done upon overflow or underflow of an up/down counter which tracks the coincidence between the amplitude window and the phase window, incrementing and decrementing symmetrically whenever window coincidence is exact; otherwise overflow or underflow results which causes isolated correction in the count of the binary counter.

9 Claims, 5 Drawing Sheets

METHOD AND APPARATUS FOR RECOVERING DATA FROM A RADIO SIGNAL

BACKGROUND OF THE INVENTION

This invention relates to a method and apparatus for recovering digitized data from a radio channel. More specifically the invention relates to synchronization and tracking of synchronous data, typically in packet format, primarily for applications where information is conveyed via radio or similar free-space-like channel. In particular, the invention relates to data processing after a synchronous signal has been demodulated to a baseband signal and filtered in preparation for information extraction. The invention is applicable to any modulation method in which a modulated signal is demodulated to an analog baseband signal for information recovery.

A number of problems have been identified in connection with the acquisition of a signal after demodulation to baseband. Due to typical frequency errors in an FM system, for example, d.c. errors are introduced into the baseband signal resulting in a d.c. level offset. In addition, it is necessary to acquire or establish the relative timing of synchronous symbols, i.e., symbol timing, so that sampling of the symbols can be synchronized for optimum data extraction. Such clock synchronization is commonly acquired during the transmission of a preamble stream of symbols. In other words, the purpose of clock synchronization is to establish a clock which can be used for controlling the sampling of subsequent symbols.

Processes are known for converting an analog signal to a digital signal for further information recovery and for signal processing using for example samples of digital values representing analog amplitude levels. What is needed is a technique for acquiring symbol timing and correcting for d.c. offset independent of one another after an analog signal has been digitized for further information recovery.

SUMMARY OF THE INVENTION

According to the invention, in a communications system using a synchronous digital data stream employing multiple-amplitude-level symbols, preamble acquisition and d.c. offset correction is achieved simultaneously. A receiving device samples, over a plurality of symbol times, a digitized representation of a preamble data stream which is composed of a sequence of alternating extreme-deviation symbols terminating in a mid-deviation symbol, and thereupon the receiver averages the sampled values in amplitude and in time to determine, respectively, the average d.c. offset and the nominal transition boundaries between symbols. The mid-deviation symbol is an indicator of the end of the preamble data stream. In a specific example, four-level FSK modulation carries a preamble of the bit values 11, 00, 11, 00, 11, 00, 11, 00, 11, 00, 01, which produces, in analog form, a sine wave after suitable baseband filtering and signal shaping. The preamble acquisition mode is initiated about two symbol times after first detection of a signal in order to allow the time-sensitive elements of the circuitry to stabilize. The d.c. amplitude of the preamble is digitized and is then digitally averaged, without knowledge of the symbol timing, over exactly an even number of symbols (2,4,6) (based on the known preselected symbol rate) to obtain a d.c. offset value. (A longer averaging window produces a more accurate offset, due to the averaging out of random noise.)

Symbol timing is extracted, during a portion of the preamble, by digitally counting by use of a binary divider between symbol transitions, then by accumulating counts for a plurality of symbols divisible by $2^n$ in an accumulator and dividing by $2^n$ to determine the average of the phase of the symbol transitions. The most significant bit (MSB) output of an analog to digital converter (ADC) is set to the center of the nominal amplitude range of the baseband signal (without concern for the actual offset of the signal), and the ADC's MSB output drives a transition detector which clocks the accumulator. The multiple-bit value clocked into the accumulator at each transition represents the phase of a free-running binary counter which is clocked by a stable high-speed clock.

After the phase counts over a period of $2^n$ transitions have been summed and divided to obtain an average, the output of the accumulator is compared with the output of the binary counter by a digital comparator which, upon a match, disables the phase accumulator and causes the binary counter to be preset to a value which aligns the binary counter to the optimum phase point for sampling a symbol (typically the midpoint of the symbol). Taps from the binary counter thereafter provide various phase-synchronized clocks for symbol timing, sample timing and bit timing, as well as for numerous other timing functions.

After symbol timing acquisition and d.c. offset acquisition, other circuitry is enabled for symbol tracking, and additional circuitry uses the acquired d.c. offset and symbol timing information to extract the data from the symbol stream.

D.c. offset tracking involves subtracting the d.c. offset value from the output of the ADC representing the digitized baseband signal to obtain an offset-corrected signal and then comparing the offset-corrected signal with the nearest expected value for a valid symbol to obtain an error, then adjusting the d.c. offset value by a fraction of the error. The new d.c. offset value is thereafter subtracted from the value of the subsequent digitized baseband signal to obtain the next offset corrected signal.

Symbol timing tracking is accomplished through a form of a digital phase locked loop. The d.c. offset-corrected digitized baseband signal is examined during a symbol timing window centered on the symbol clock transition for signal amplitude near the nominal center of amplitude ranges expected for any one of the allowable symbols. Timing is corrected for a range of clock drift by adding counts to or subtracting counts from the binary counter which was previously preset during the acquisition mode. The subtracting and adding may be done, respectively, upon overflow or underflow of an up/down counter which tracks the coincidence between the amplitude window and the phase window, incrementing and decrementing symmetrically whenever window coincidence is exact; otherwise overflow or underflow results which causes isolated correction in the count of the binary counter.

The invention will be better understood upon reference to the following detailed description in connection with the accompanying drawings.

DESCRIPTION OF SPECIFIC EMBODIMENTS

Figure 1:
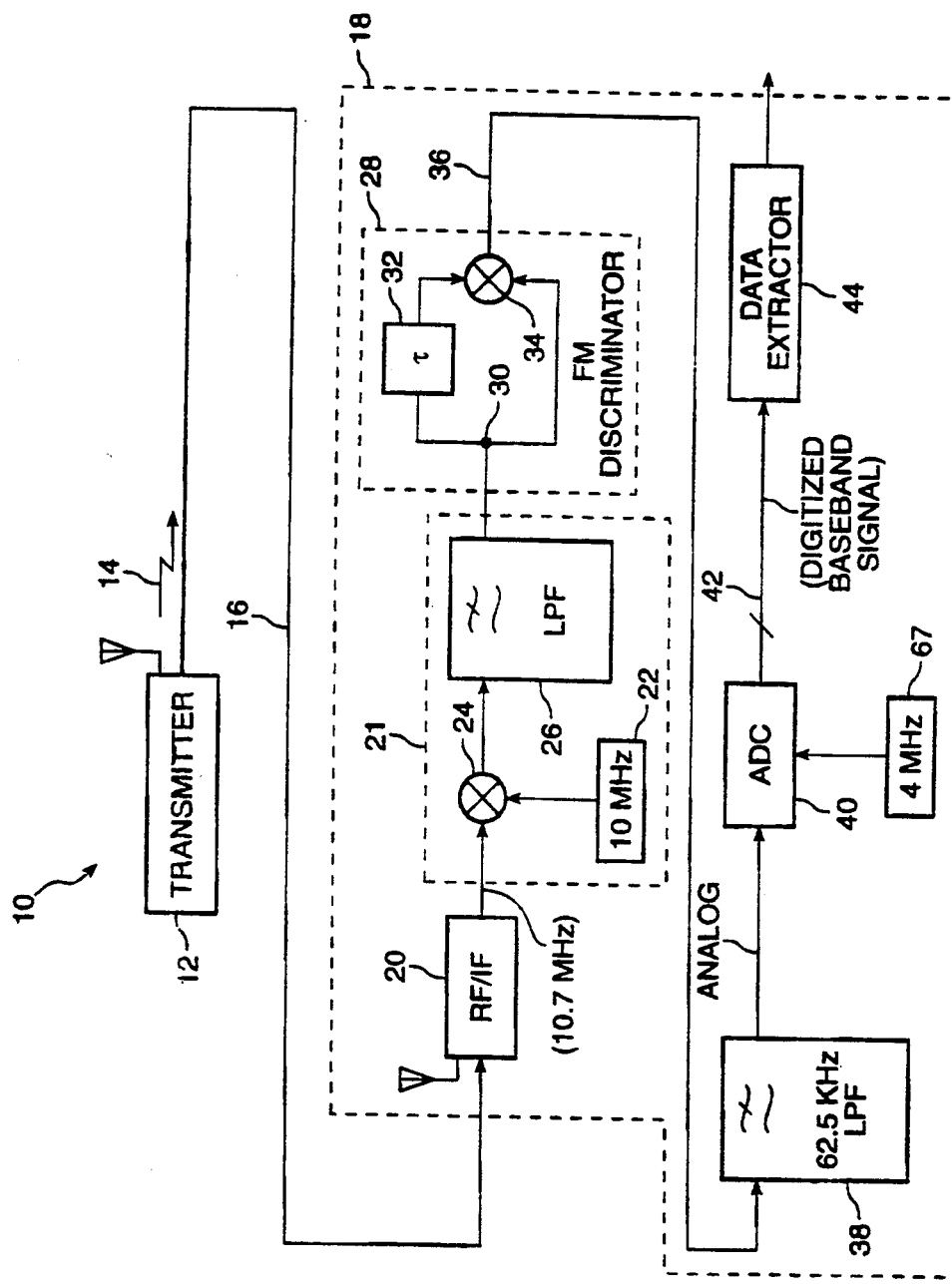
FIG. 1 is a block diagram of a digital radio communication system including demodulator and digitizer for a digital signal receiver according to the invention.

Referring to FIG. 1, a block diagram is shown of a digital radio communication system 10. The system 10 includes a transmitter 12 which produces a radio frequency (r.f.) signal 14 in analog form which is modulated with digitized information in a form of a multiple-level frequency-shift keyed signal, preferably continuous-phase four-level frequency shift keying. The r.f. signal is applied to a radio channel 16 which is presumed to be characterizable by a transfer function determined for example by the finite impulse response of the channel 14. While the basic structure of the transmitter 12 and channel 14 is not of direct interest, it is presumed that the transmitter 12 is capable of emitting a signal representing a digital bit stream of a preselected form. The bit stream form is preselected to allow synchronous detection in accordance with the invention. Specifically, a required driving function to be used by the transmitter is obtained by dividing the ideal response by the channel transfer function. The required driving function in a specific embodiment is calculated for all possible combinations of four symbols, sixteen times per symbol for a duration of five symbol times. The results may be stored in a lookup table, such as an EPROM (not shown) in the transmitter 12 for ease of implementation and high-speed operation, and the output of the lookup table is programmed with codes which control the instantaneous frequency desired for the frequency modulator (not shown) of the transmitter 12.

The frequency modulated signal 14, which is conveyed by the radio channel 16, together with noise, is received at a digital data receiver 18. The digital data receiver 18 includes means 20 for downconverting and limiting the r.f. signal 14 from its radio frequency to an intermediate frequency (i.f.) of typically about 10.7 MHz for further processing as a pulse train, the frequency of which is the signal to be detected. The i.f. signal at 10.7 MHz is further downconverted by a subsystem 21 to pass a signal at typically 700 kHz center frequency. The downconverting subsystem 21 includes a stable 10 MHz frequency reference 22 applied to a mixer 24, the output of which is applied to a low-pass filter 26. The bandlimited output of this downconverting subsystem 21 is then applied to an fm discriminator 28. The fm discriminator 28 comprises a signal splitter 30, a delay 32 and a multiplier 34 (actually an exclusive OR gate). The discriminator 28 mixes a representation of the signal with a delayed representation of the signal to produce a pulse train at output 36, the low frequency components of which are used as a baseband signal after filtering. The baseband signal is applied through a multiple-pole low-pass filter 38 with a typical bandwidth of 62.5 kHz. The low-pass filter 38 may be for example a five-pole analog filter with Butterworth transfer characteristic.

The output of the filter 38 is coupled to an analog to digital converter (ADC) 40 to produce a digitized baseband signal on signal bus 42 for analysis by a data extractor 44 as hereinafter explained. The ADC 40 may be for example a six-bit ADC clocked by a sample clock 67 at 4 MHz. The gains of the ADC 40 and the filter 38 are adjusted such that the nominal frequency difference between symbol levels corresponds to the voltage required to change bit 4 of the six-bit converter, or ⅛ of the full scale voltage of the ADC 40. The ADC bits are utilized as follows, assuming bit one is the least significant bit (LSB) and bit six is the most significant bit (MSB). (High is considered "True" and low is considered "Not True".)

If both bits five and six are high, the signal is considered to be at the high limit. If both bits five and six are low, the signal is considered to be at the low limit. The state of bits four and six indicate the two demodulated and sliced data bits. Bits one, two and three are used to determine the signal's d.c. offset from the nominal level, as well as the signal to noise ratio ($E_b/N_0$). Bit timing is determined by examination of bits two, three, five and six.

Figure 2:
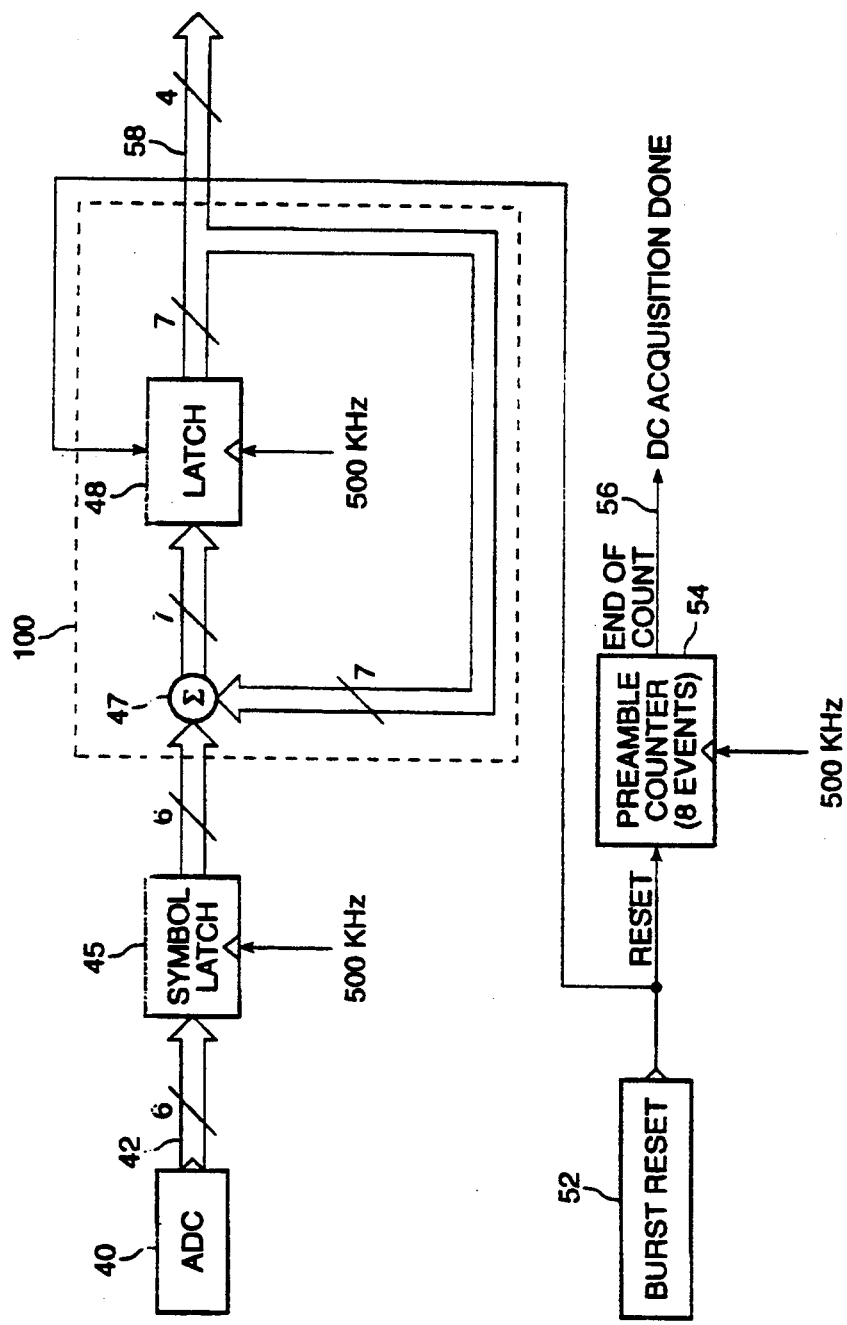
FIG. 2 is a block diagram of a d.c. offset correction acquisition circuit according to a preferred embodiment of the invention.

Referring to FIG. 2, there is shown a portion of the data extractor 44 used for data acquisition. This circuitry is intended to respond to a specific bit sequence recognizable by the receiver, called a preamble sequence, designed for establishing synchronization of subsequent information-carrying data. In accordance with the invention, the preamble sequence in a preferred embodiment consists of a series of twelve alternating logic symbols from the set representing the digital values "00," "01," "10," and "11," namely, the "11" and "00" symbols, the "11" and "00" symbols producing the extrema of deviation in the f.m. signal. The series is concluded by a "01" symbol, a mid-deviation symbol. The preamble allows the receiver to acquire the signal, calibrate its circuits and recognize the end of the preamble. More specifically, the received signal containing the preamble is digitized, sampled over a number of symbol times to obtain samples of amplitude and samples of time of transitions, then the samples are averaged in amplitude to determine the average d.c. offset of amplitude, and the transition times are averaged to determine the transition boundaries between symbols.

In FIG. 2, the digitized baseband signal 42 is applied to a symbol latch 45, where it is sampled at 500 kHz. The six bits so sampled are fed to a d.c. offset accumulator formed of a summer 47, a seven-bit latch 48 (which has a preset input) and a symbol clock 50. The summer 47 receives input from the symbol latch 45 and the output of the latch 48 which is fed back to the summer 47. The output of the summer 47 is applied to the latch 48. The latch 48 samples the output of the summer 47 at a rate of at least twice per symbol under control of a symbol clock 50. The summer 47 adds the summed values to the input values to accumulate a summed value in the latch 48. During the acquisition period, eight measurements of the amplitude of the digitized baseband signal are taken. The end of the eight events is signaled by an eight-event down-counter 54, which issues an "end of count" signal 56 indicating that the d.c. acquisition is done. The latch 48 is preset at the start of each acquisition sequence to the value eight (bit four is set True) and then it is clocked three bits worth (eight times), which places the preset value in the latch 48 at the center of the range for signed arithmetic. At the end of eight measurements of the content of the symbol latch 45, the resultant accumulated value in the latch 48 is divided by eight, leaving an average corresponding to the d.c. offset of the digitized baseband signal. Division by eight is accomplished by ignoring the three least significant bits, i.e., shifting "right" three bit positions. It is the resultant four-bit output 58 of latch 48 (hereafter 104) which is used subsequently in symbol d.c. offset tracking.

Figure 3:
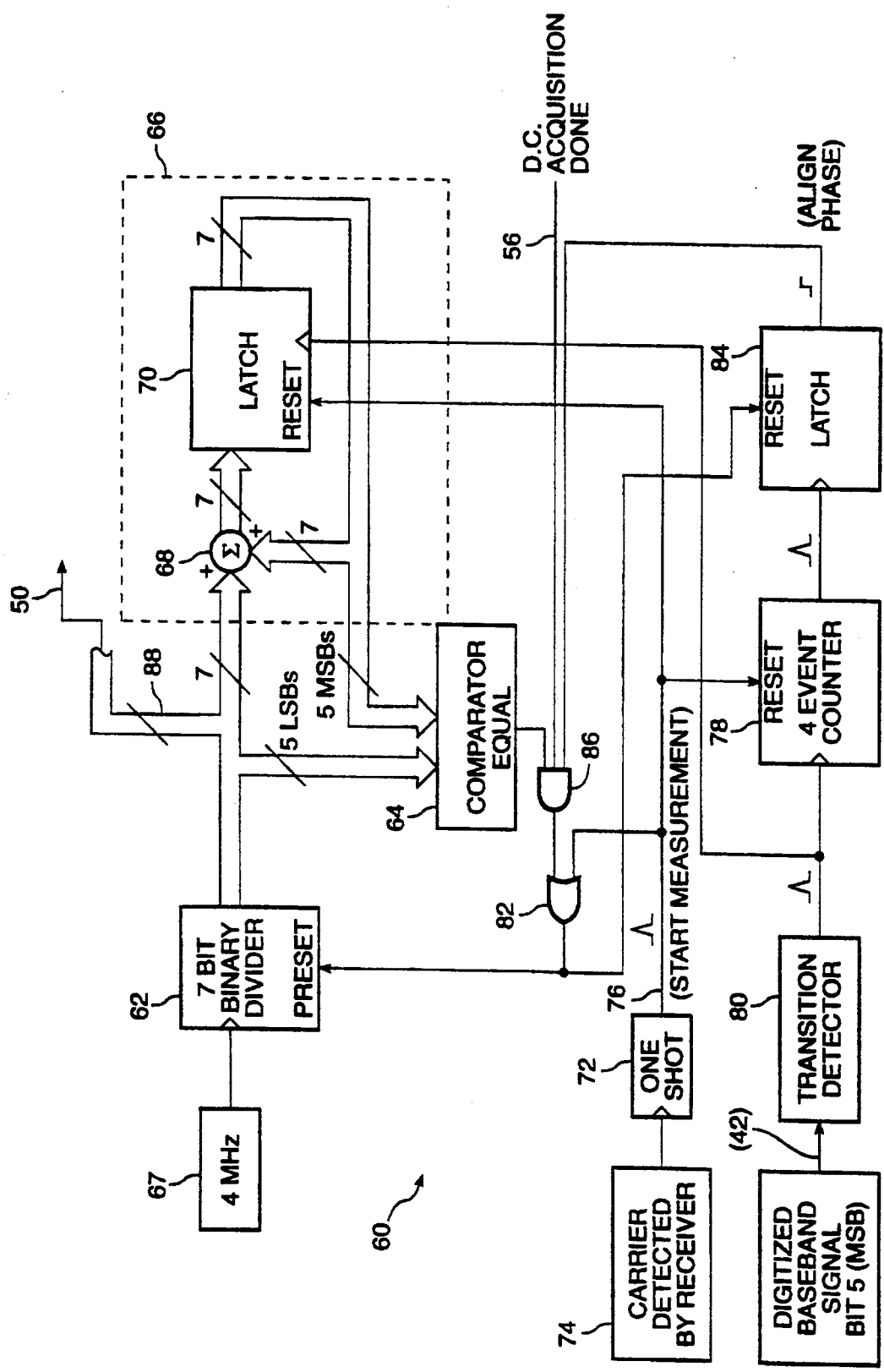
FIG. 3 is a block diagram of a symbol timing acquisition circuit according to a preferred embodiment of the invention.

An important element of the invention is symbol timing acquisition and the circuitry for symbol timing acquisition. Referring to FIG. 3, there is shown a block diagram of the symbol timing acquisition circuitry 60 according to the invention comprising a seven-bit binary clock counter/divider 62, a comparator 64, a phase accumulator subcircuit 66, and selected control elements explained hereinafter. The phase accumulator subcircuit 66 includes an adder 68 and a seven-bit latch 70. A one-shot 72, responsive to a "carrier detected" signal source 74 from the receiver front end is used to issue a start measurement signal (line 76) to reset the latch 70 and to a four-event counter 78 (used to count the number of transitions from a transition detector 80 monitoring the MSB (Bit 5) of the digitized baseband signal 42). The start measurement signal is one of two signals which (through an OR gate 82) can preset the clock divider 62 to a base phase value (to account for internal propagation delays) and a phase alignment latch 84 which itself is clocked by the "carry" signal (fourth event) of the four-event counter 78. The final preset signal is produced by the coincidence of an "equal" signal from the comparator 64, after a "d.c. acquisition done" signal 56 (FIG. 2), with the output of the phase alignment latch 84 indicating that the period for phase alignment has been terminated. When the output of the binary divider 62 is equal to the output of the latch 70, an equality signal is issued by the comparator 64. This value (through a preset signal to the binary divider 62) is then used for establishing the offset timing of the symbol clock for subsequent symbol extraction.

Symbol timing is extracted, during a portion of the preamble, by digitally counting using the binary divider 62 between symbol transitions, accumulating in accumulator 66 counts for a plurality of symbols divisible by $2^n$ and dividing by $2^n$ (by bit shifting) to determine the average of the phase of the symbol transitions. The clocked seven-bit binary divider 62 is used to divide the signal of a stable 4-MHz clock 67 into various clock signals, all seven bits being fed to the phase accumulator 66 and the five least significant bits (LSBs) being fed to a first input of the comparator 64. In the phase accumulator 66, the summer 68 adds the seven bits to the accumulated seven-bit output of the latch 70, which is clocked each time a transition is detected by the transition detector 80. The sum at summer 68 is fed to the second input of the latch 70, thus resulting in an accumulation of a digital value representing an accumulation of phase relative to the transition point (i.e., offset). The five MSBs of the latch output are fed to the second input of the comparator 64, which issues an "Equal" signal to the AND gate 86 when the five LSBs of the binary divider 62 match the five MSBs of the latch 70.

The two-bit difference is the effective division by four for averaging the latch 70 output over four events.

As a further explanation of operation, the most significant bit (MSB) output (e.g., bit 5) of the analog to digital converter (ADC) 40 (FIG. 1) is set to the center of the maximum-possible amplitude range of the baseband signal (without concern for the actual offset of the signal), and the ADC's MSB output drives transition detector 80, which in turn clocks the latch 70 of accumulator 66 for $2^n$ (=four) events.

After $2^n$ symbol transitions (e.g., four events, in this circuit), the output of the accumulator 66 is compared with the output of the binary counter 62 by digital comparator 64 which, upon a match, causes the binary counter 62 to be preset to its initial value. Since the preset signal occurs at a particular time in the count of the binary divider 62 relative to the average transition time of four events in the preamble of a received signal, subsequent count values of the binary divider 62 will be synchronized to the received synchronous symbols, establishing the optimum time for sampling a symbol (typically the midpoint of the symbol). Taps from the binary counter output (e.g., taps on output lines 88) thereafter provide various phase-synchronized clocks for symbol timing, sample timing and bit timing, as well as for numerous other timing functions.

Once the d.c. offset, which corresponds to the center frequency of the input signal, and the symbol timing have been acquired, circuitry is provided for d.c. offset tracking and symbol timing tracking. The circuitry typically shares components with circuitry used for acquisition.

Figure 4:
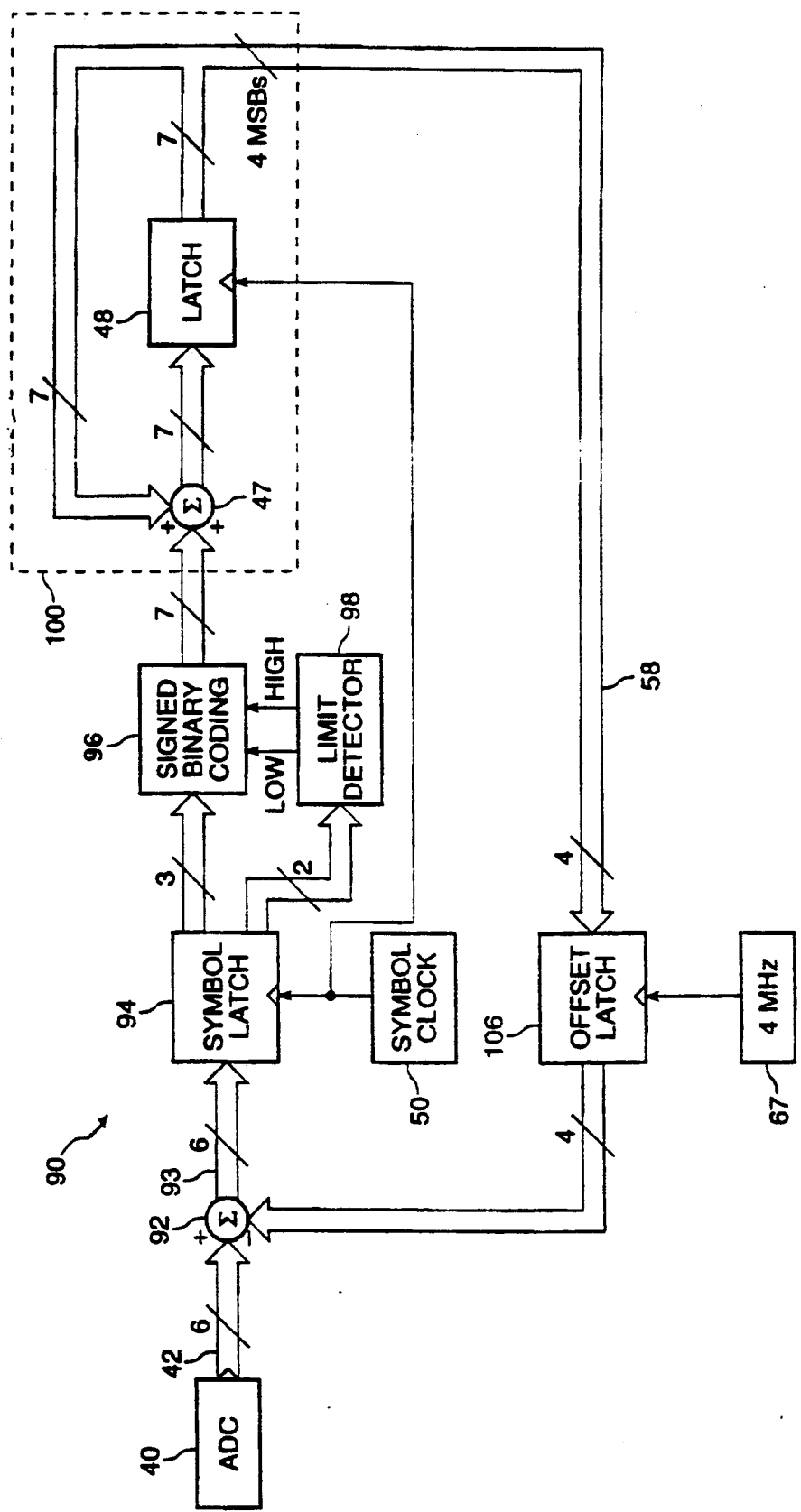
FIG. 4 is a block diagram of a d.c. offset tracking circuit according to a preferred embodiment of the invention.

The d.c. offset may drift with time. Referring to FIG. 4, there is shown a block diagram of a d.c. offset tracking circuit 90 as part of the data extractor 44 for tracking d.c. offset after symbol timing acquisition has been completed. The digitized baseband signal 42 (FIG. 1) is fed to a first adding input of a summer 92, the output of which is applied as an error word on line 93 to a first, or "symbol", latch 94, which latches under control of the symbol clock 50. The output of the symbol latch 94 is split and fed to a signed binary coding element 96 and a limit detector 98, as hereinafter explained.

A coded output of the coding element 96 is fed to a d.c. offset accumulator 100, and specifically to a first input of a second summer 102 (previously summer 47) coupled to a second latch 104 (previously latch 48), also clocked by the symbol clock 50. The output of the second latch 104 is fed back to the second input of the second summer 102, and the (four) most significant bits are fed to a d.c. offset latch 106, which is driven by the stable 4 MHz clock. The output of the latch 106 is fed synchronously to a second, subtracting input of the first summer 92 in order to create the error word signal on signal path 93.

D.c. offset tracking involves subtracting the d.c. offset value (captured in d.c. offset latch 106) from the output of the ADC 40 representing the digitized baseband signal 42 to obtain an offset-corrected signal (on path 93) and then comparing the offset-corrected signal with the nearest expected value for a valid symbol (represented by values in the signed binary coding element 96 to obtain an error, then adjusting (through the d.c. offset accumulator 100) the d.c. offset value by a fraction of the error. The new d.c. offset value (captured in the d.c. offset latch 106, which is the same as latch 48) is thereafter subtracted from the value of the subsequent digitized baseband signal 42 to obtain the next frame of the error word signal on output path 93.

In this circuit, the difference between the instantaneous d.c. offset from latch 94 and the estimated d.c. offset creates an error word of seven bits width at the output of the binary coding element 96. The d.c. offset accumulator 100 functions as an integrator which causes the estimated d.c. offset to track the actual d.c. offset, thereby forcing the error word to zero.

Bit four of the digitized baseband signal 42 is aligned with the three decision points between the four symbol levels of this encoding scheme. Hence, bits one, two and three represent the deviation between the voltage of the measured baseband signal and the expected voltage at the nominal sample time, regardless of the symbol which has been sent. In order to take advantage of this characteristic, input bits one, two and three (AD0, AD1, AD3) are encoded to form an output (through the signed binary coding element 96) as shown in Table I.

TABLE I

| INPUT | | | OUTPUT | | | |
|---|---|---|---|---|---|---|
| AD2 (MSB) | AD1 | AD0 (LSB) | B3-B6 MSBs | B2 | B1 | B0 (LSB) |
| 0 | 0 | 0 | 1 | 1 | 0 | 0 |
| 0 | 0 | 1 | 1 | 1 | 0 | 1 |
| 0 | 1 | 0 | 1 | 1 | 1 | 0 |
| 0 | 1 | 1 | 1 | 1 | 1 | 1 |
| 1 | 0 | 0 | 0 | 0 | 0 | 1 |
| 1 | 0 | 1 | 0 | 0 | 1 | 1 |
| 1 | 1 | 0 | 0 | 0 | 1 | 1 |
| 1 | 1 | 1 | 0 | 1 | 0 | 1 |
| low limit | low limit | low limit | 1 | 1 | 0 | 0 |
| high limit | high limit | high limit | 0 | 1 | 0 | 1 |

The four most significant bits are all coded identically. The two input bits (five and six) are used to indicate large d.c. offsets which force the signal to a low or a high limit. Upon encountering such a limit, the accumulator 100 is incremented or decremented by the maximum amount allowed on the MSBs out of the signed binary coding element.

Figure 5:
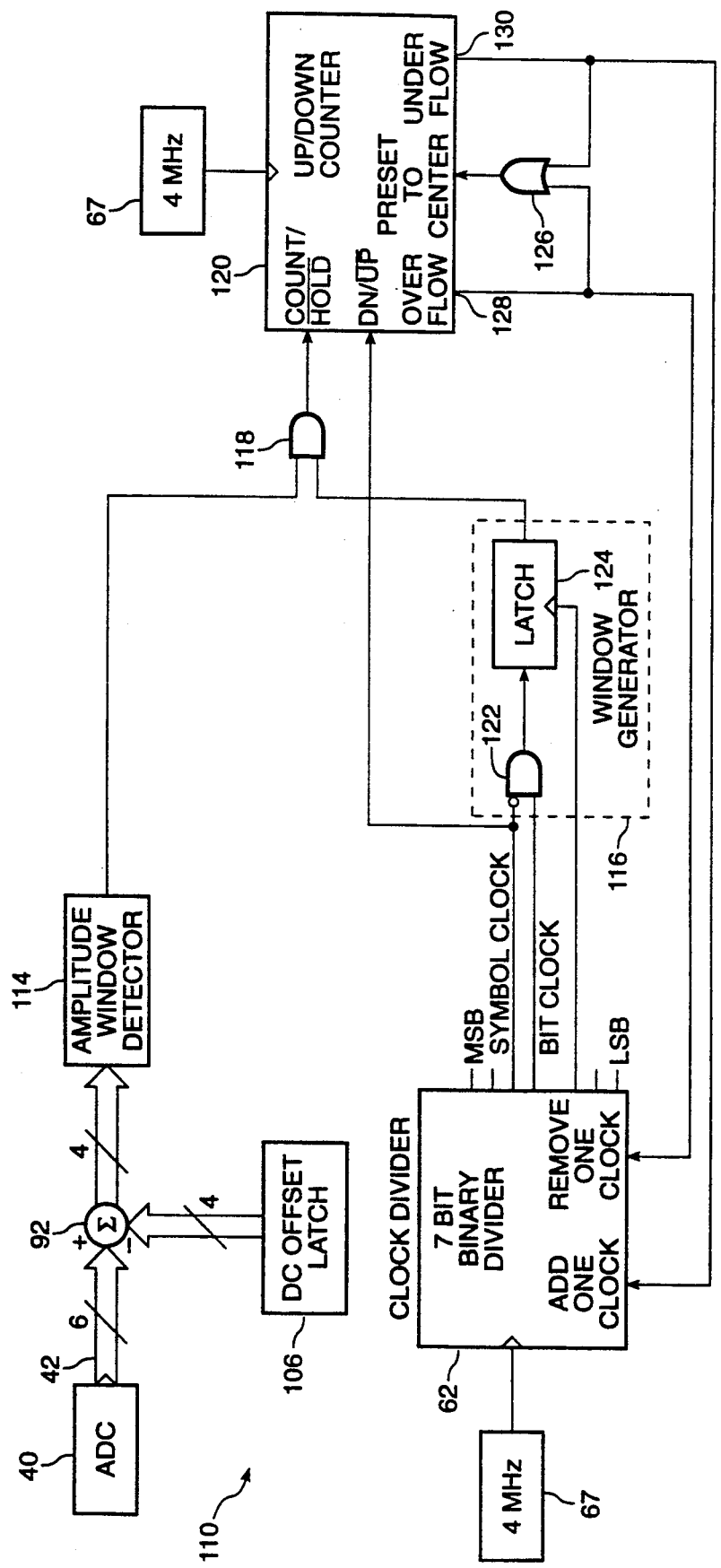
FIG. 5 is a block diagram of a symbol timing tracking circuit according to a preferred embodiment of the invention.

Symbol timing may drift with time. Referring to FIG. 5, there is shown a block diagram of a symbol timing tracking circuit 110 as part of the data extractor 44 for tracking symbol timing after symbol timing acquisition has been completed.

Symbol timing tracking is accomplished through a form of a digital phase locked loop using the binary divider 62 (FIG. 3) employed to capture the phase offset. The digitized baseband signal 42 is applied to summer 92 (FIG. 5) which is used to correct for d.c. offset using the content of the latch 106 which feeds a subtracting input of summer 122 on signal path 58. The output of the summer 92 is applied to an amplitude-sensitive window detector 114. The output thereof is an indication of the presence of a signal, thereby establishing the presence of a valid signal relative to a relevant time window which is generated by a window generator 116. The output of the window generator 116 and the amplitude window detector 114 are ANDed by AND gate 118 to control the COUNT/HOLD input of an up/down counter 120 which provides a small error correction signal to the binary divider 62 which divides the clock as hereinafter explained. A symbol clock, derived from the third-most significant bit of binary divider 62, controls the DOWN/UP input of the up/down counter 120. A bit clock derived from the fourth-most significant bit is ANDed in AND gate 122 of the window generator 116 with the inverse of the symbol clock signal to supply a one-bit value to be latched in a one-bit latch 124 upon clocking by a window generator clock, also derived from the binary divider 62. The window generator clock operative at twice the rate of the bit clock is used to clock the latch 124.

The up/down counter 120, driven by the high-speed stable clock, is automatically preset to a center value whenever the registers overflow or underflow through an OR gate 126. The overflow output 128 causes the binary divider 62 to remove one clock count from its clock output at the least significant bit, and the underflow output 130 causes the binary divider 62 to add one clock count from the least significant bit, thereby shifting the patch of the qualifying window to steer it toward the center of the "eye" pattern in the filtered baseband signal, thereby optimizing the window for detection.

More specifically, the d.c. offset-corrected digitized baseband signal is examined during a symbol timing window centered on the symbol clock transition for signal amplitude near the nominal center of amplitude ranges expected for any one of the allowable symbols. Timing is corrected for a range of clock drift by adding counts to or subtracting counts from the binary divider 62 which was previously preset during the acquisition mode. The subtracting and adding is done, respectively, upon overflow or underflow of the up/down counter 120 which is tracking the coincidence between the amplitude window (through 114) and the phase window (through 116), incrementing and decrementing symmetrically whenever window coincidence is exact; otherwise overflow or underflow results, which causes isolated correction in the count of the binary divider 62.

The invention has now been explained with reference to a specific embodiment. Other embodiments will be apparent to those of ordinary skill in the art. It is therefore not intended that the invention be limited except as indicated by the appended claims.

What is claimed is:

1. In a telecommunications system, a method in a receiver for simultaneously extracting offset and phase information from a synchronous multiple-amplitude-level baseband signal which has been digitally modulated and transmitted by a transmitter, said method comprising the steps of:

providing from the transmitter to the receiver, as part of the multiple-amplitude level baseband signal, a preamble comprising a sequence of alternating extreme-deviation symbols terminating in a mid-deviation symbol; and thereafter at the receiver:

digitizing the baseband signal through an analog to digital converter to obtain a digitized baseband signal;

sampling the digitized baseband signal over a plurality of symbol times to obtain samples; and thereafter averaging the samples in amplitude and in time substantially simultaneously to determine average d.c. offset of amplitude and nominal transition boundaries between symbols.

2. In a telecommunications system, a method in a receiver for simultaneously extracting offset and phase information from a synchronous multiple-amplitude-level baseband signal which has been digitally modulated and transmitted by a transmitter, said method comprising the steps of:

providing from the transmitter to the receiver, as part of the multiple-amplitude level baseband signal, a preamble comprising a sequence of alternating extreme-deviation symbols terminating in a mid-deviation symbol; and thereafter at the receiver:

digitizing the baseband signal through an analog to digital converter to obtain a digitized baseband signal;

sampling the digitized baseband signal over a plurality of symbol times to obtain samples; and thereafter averaging the samples in amplitude and in time substantially simultaneously to determine average d.c. offset of amplitude and nominal transition boundaries between symbols wherein said averaging step further comprises averaging the samples over exactly an even number of symbol times based on a preselected symbol rate in order to obtain d.c. offset value.

3. In a telecommunications system, a method in a receiver for simultaneously extracting offset and phase information from a synchronous multiple-amplitude-level baseband signal which has been digitally modulated and transmitted by a transmitter, said method comprising the steps of:

providing from the transmitter to the receiver, as part of the multiple-amplitude level baseband signal, a preamble comprising a sequence of alternating extreme-deviation symbols terminating in a mid-deviation symbol; and thereafter at the receiver;

digitizing the baseband signal through an analog to digital converter to obtain a digitized baseband signal;

sampling the digitized baseband signal over a plurality of symbol times to obtain samples; and thereafter averaging the samples in amplitude and in time substantially simultaneously to determine average d.c. offset of amplitude and nominal transition boundaries between symbols wherein said averaging step further comprises initiating the averaging after at least one symbol time after initial detection of a baseband signal in order to allow time-sensitive circuitry to stabilize.

4. In a telecommunications system, a method in a receiver for simultaneously extracting offset and phase information from a synchronous multiple-amplitude-level baseband signal which has been digitally modulated and transmitted by a transmitter, said method comprising the steps of:

providing from the transmitter to the receiver, as part of the multiple-amplitude level baseband signal, a preamble comprising a sequence of alternating extreme-deviation symbols terminating in a mid-deviation symbol; and thereafter at the receiver;

digitizing the baseband signal through an analog to digital converter to obtain a digitized baseband signal;

sampling the digitized baseband signal over a plurality of symbol times to obtain samples; and thereafter averaging the samples in amplitude and in time substantially simultaneously to determine average d.c. offset of amplitude and nominal transition boundaries between symbols wherein said symbol timing is determined by:

digitally counting between symbol transitions using a binary divider;

accumulating counts in an accumulator over a period equal to a plurality of symbol times divisible by $2^n$, where n is an integer; and dividing said accumulated counts by $2^n$ in order to determine a phase average of symbol transitions.

5. The method according to claim 4 further comprising:

setting the most significant bit output of the analog to digital converter to trigger at the center of the nominal zero-to-peak amplitude range of the baseband signal;

driving a transition detector with said most significant bit output; and clocking the accumulator with the output of the transition detector.

6. The method according to claim 5 further comprising the steps of:

digitally comparing the output of the binary divider with the output of the accumulator for a match; and upon match, disabling the accumulator, presetting the binary counter with a value indicative of the optimum phase point for sampling a symbol.

7. The method according to claim 6, further comprising:

employing taps from bit positions of the binary divider as phase synchronized clocks for timing functions.

8. In a telecommunications system, a method in a receiver for tracking d.c. offset of a synchronous multiple-amplitude-level baseband signal which has been digitally modulated and transmitted by a transmitter, said method comprising the steps of:

digitizing the baseband signal through an analog to digital converter to obtain a digitized baseband signal;

sampling the digitized baseband signal to obtain samples; and thereafter examining the digitized baseband symbol during a symbol timing window centered on a symbol clock transition for signal amplitude near the nominal center of amplitude ranges expected for any one of allowable symbols; and correcting timing for clock drift by adding counts to and subtracting counts from a binary clock divider which has been preset during an acquisition mode.

9. The method according to claim 8 wherein said adding counts comprises responding to underflow of said binary divider and said subtracting counts comprises responding to overflow of said binary divider, said binary divider tracking coincidence between an amplitude window and a phase window.

* * * * *